Figure 1:
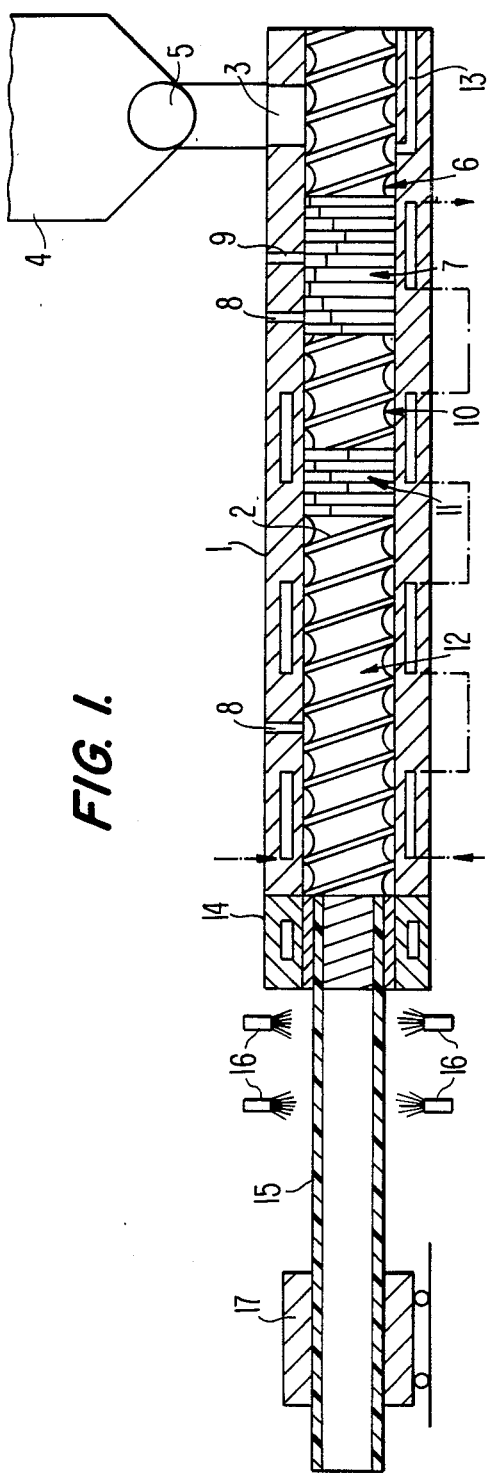

United States Patent [19]

Müller et al.

[11] Patent Number: 4,759,824
[45] Date of Patent: Jul. 26, 1988

[54] APPARATUS FOR THE MANUFACTURE OF COMBUSTIBLE CASES BASED ON NITROCELLULOSE AS SHAPED AMMUNITION FOR TUBULAR WEAPONS

[76] Inventors: Dietmar Müller, Heinrich-Lilienfeinweg 2, D-7500 Karlsruhe 41; Fred Volk, Haydenstr. 17, D-7519 Walzbachtal 2, both of Fed. Rep. of Germany

[21] Appl. No.: 816,113

[22] Filed: Jan. 3, 1986

[30] Foreign Application Priority Data

Jan. 3, 1985 [DE] Fed. Rep. of Germany ....... 3500067

[51] Int. Cl.⁴ .............................................. D21J 3/04
[52] U.S. Cl. ..................................... 162/396; 162/408;
100/117; 264/150; 264/151; 425/202; 425/296;
425/106
[58] Field of Search ...................... 366/76, 77; 100/94,
100/95, 98 R, 117; 425/200, 202, 106, 204,
206–209, 224, 296, 527, 528, 262, 292, 296,
302.1, 308, 309, 325, 327, 376 R, 392, 393, 404;
162/407, 408, 415, 416, 396, 380, 381, 382, 289;
264/151, 150, 319, 323

[56] References Cited

U.S. PATENT DOCUMENTS

| | | | |
|---|---|---|---|
| 2,434,690 | 1/1948 | Ferla | 162/408 |
| 2,857,824 | 10/1958 | Fair | 162/415 |
| 2,884,062 | 4/1959 | Taylor | 162/415 |
| 3,039,138 | 6/1962 | Hall et al. | 264/151 |
| 3,089,192 | 5/1963 | Adams | 264/349 |
| 3,205,128 | 9/1965 | Justus et al. | 162/408 |
| 3,888,617 | 6/1975 | Barnett | 425/296 |
| 3,939,236 | 2/1976 | Hahn | 425/296 |
| 4,136,251 | 1/1979 | Bice et al. | 264/349 |
| 4,178,207 | 12/1979 | Oversohl | 162/384 |
| 4,397,231 | 8/1983 | Burgin | 100/117 |
| 4,446,094 | 5/1984 | Rossiter | 264/349 |

Primary Examiner—Jan H. Silbaugh
Assistant Examiner—Jill L. Fortenberry
Attorney, Agent, or Firm—Antonelli, Terry & Wands

[57] ABSTRACT

Shaped ammunication for tubular weapons in the form of nitrocellulose-based combustible cartridge cases are continuously produced in a screw extruder from an aqueous suspension, stabilizers, flammable fibrous material, binders and optionally plasticizers being supplied to the suspension. The fibre-like constituents are matted in kneading and pressing zones, accompanied by the simultaneous squeezing out of the water, being shaped to an endless tubular structure, which is then cut to the length of the individual cartridge cases and is optionally also pressed to the desired dimensions and shape. Advantageously use is made of a double shaft screw extruder with kneading and pressing segments, as well as a water outlet, which is provided at its end with a tubular die. A following pressing and cutting to length means is arranged behind the extruder.

8 Claims, 1 Drawing Sheet

U.S. Patent   Jul. 26, 1988   4,759,824

APPARATUS FOR THE MANUFACTURE OF COMBUSTIBLE CASES BASED ON NITROCELLULOSE AS SHAPED AMMUNITION FOR TUBULAR WEAPONS

The invention relates to a process for the production of NC-based combustible cartridges as shaped ammunition for tubular weapons from an aqueous suspension of nitrocellulose, NC-stabilizers, flammable fibrous material, synthetic resin, optionally further binders and plasticizers by matting and shaping the cylindrical cartridge case, accompanied by the simultaneous squeezing out of excess water. The invention is also directed at an apparatus for performing the process.

Combustible shaped ammunition is used as cartridge case, propellant charge containers or as detonation tubes and is intended to permit a complete combustion in the tubular weapon. As a result of the NC content and the addition of possibly higher energy explosives, such as nitropentan, cyclonite or the like, for safety reasons processing can only take place from an aqueous suspension. The fibres are sucked from the suspension onto a mandrel, so that they are deposited on the outside thereof and mat together. The blank is compressed in heated presses, dried and cut to size.

The known process is extremely time consuming, because the cartridge cases have to be individually produced and must successively pass through several working stations. It is also disadvantageous that the binder is fed into the aqueous suspension, so that it is sucked onto the mandrel together with the fibres, only few binder being suitable for this procedure. Instead of this the binding can also be subsequently sprayed onto the blank, but then a satisfactory homogeneous mixing is no longer possible. The wall thickness or density of the cartridge case can also vary slightly after pressing if, for flow reasons, during the suction onto the mandrel a uniform fibrous layer is not deposited on the latter.

The problem of the invention is to propose a continuous process, which also leads to uniform, reproducible wall thicknesses on the cartridge. case.

According to the invention this problem is solved in that the suspension is continuously supplied to a screw extruder, which mats fibre-containing constituents in kneading and pressing zones, accompanied by the simultaneous squeezing out of the water, shapes to an endless, tubular structure and cuts the latter into individual cases.

Thus, starting from an aqueous suspension, the inventive process produces an endless, tubular structure in a continuous operation and then the cartridge cases can then be cut to length by simple separating or severing processes. The matting and at least the prepressing of the fibres to the cases takes place in a single continuous operation. The continuous extrusion also ensures a uniform wall thickness, because the fibrous material is uniformly matted and compressed in the kneading and pressing zones in the case of a corresponding process length, i.e. a uniform consistency is obtained and also the discharged tubular structure is calibrated on leaving the extruder. Draining within the screw extruder can take place through a rearwardly lead drain line, optionally with the aid of feed or delivery means. Extruders of this construction are known per se (German patent No. 32 25 065).

The process according to the invention also gives the possibility of feeding the binders downstream of the delivery of the suspension.

The binders are preferably added to a zone where most of the water has already been squeezed out. This makes it possible to use binders, which cannot be processed in the aqueous phase. If, as is preferably provided, the binders are injected in liquid form, this leads to the further advantage that on the one hand they are homogeneously mixed in and on the other the fibrous material does not become dry in the complete extrusion zone, which increases safety during extrusion.

If necessary, synthetic resin can be sprayed onto the tubular structure leaving the screw extruder in order to smooth the cartridge case surface and generally strengthen the latter. Thus, said spraying also takes place continuously.

According to a further advantageous development, prior or during the cutting to length, the tubular structure can be pressed to the desired case dimensions and shape, so that the case is simultaneously given the desired final density.

Advantageously the extrusion of the suspension and the shaping to the tubular structure are performed at elevated temperature, e.g. >50° C., so that the plasticizing action during extrusion is increased and the rheological behavior improved.

According to the invention, the aforementioned process can be performed with a twin-shaft screw extruder with kneading and pressing segments arranged immediately after the inlet point for the suspension and a water outlet, with at least one binder injection nozzle arranged in the vicinity of the kneading segments or downstream thereof and a female die for shaping a tube arranged at the outlet.

In an apparatus constructed in this way, immediately following the intake, water is squeezed out and the fibrous material compressed and both contrarotating and synchronized means can be used. Following the injection of the binder, there are kneading zones in order to homogeneously incorporate the binder. Practical tests have shown that the extruder process length should be between 10 and 35 D, D being the screw diameter. The effective length is dependent on the suspension concentration and its composition, as well as on the required characteristics of the combustible cartridge case. The characteristics of the latter can also be influenced by the nature of the operation of the twin shaft screw extruder. Thus, with a synchronized means a relatively porous construction is obtained, whereas with a contrarotating means the tubular structure discharged is more compact. Further control possibilities are provided by the temperature in the extruder, the screw geometry and the added binder proportion. These parameters make it possible to adapt the case material to the conditions in the chamber of the tubular weapon.

According to a preferred embodiment of the invention, behind the screw extruder die is provided a spraying means for applying synthetic resin to the outside of the tubular structure leaving the die, in order to give specific characteristics to the surface of what will subsequently be the cartridge case.

According to another feature of the invention, behind the female die or spraying means, there is a following cutting to length means. The latter can be constructed in the manner of flying shears enabling the case portions to be cut from the tubular structure in accordance with the movement speed thereof, so that the cases are continuously obtained.

According to another preferred embodiment, behind the female die there is a following pressing means for the tubular structure, which works the tube material to its final density and shape. The tube material is also calibrated here.

It is particularly advantageous if the pressing means and cutting means are combined to form a standardized single component and are arranged on a common slide. This keeps the constructional expenditure low and the pressing means simultaneously serves as a holder for the cutting process, so that there can be no deformation of the tube or case.

In a particularly simple manner, this is achieved in that the cutting to length means is arranged in the central region of the pressing means, so that on the one hand the tube is pressed to the case size at its leading end and on the other the case which has been cut of just beforehand is still located in the press mould.

The pressing means appropriately comprises outer and/or inner jaws, which are roughly centrally split in the axial direction and guide there the cutting means tool.

The process according to the invention and apparatus used for performing the same enables combustible cartridge cases with the following composition to be produced:

35 to 82% nitrocellulose with stabilizers
12 to 45% kraft pulp combustible synthetic fibres and
6 to 20% plastic binders/synthetic resin.

In a number of cartridge case type, talc has proved advantageous as a further additive for improving the life of the tube and is added in a proportion of up to 20%. Talc has a positive action during extrusion when extruding the cases according to the invention and inter alia the sliding characteristics are improved.

The invention is described in greater detail hereinafter relative to the drawings, wherein show:

FIG. 1, a longitudinal section through a double shaft screw extruder with following spraying and pressing means.

Figure 2:
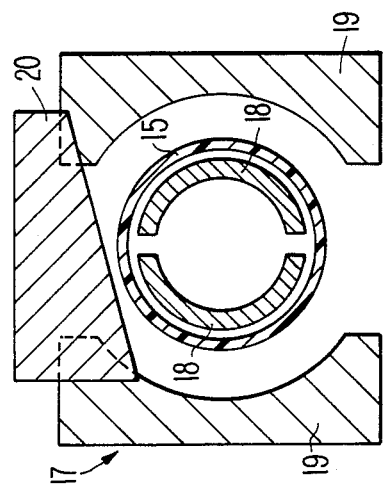

FIG. 2, a section through the pressing means.

Figure 3:
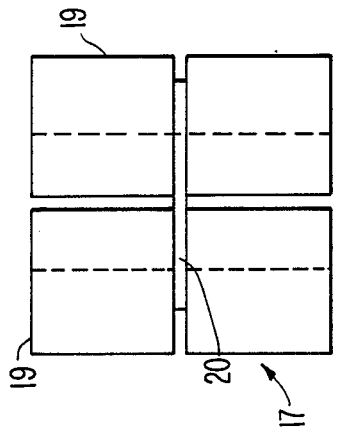

FIG. 3, a plan view of the pressing means.

Figure 4:
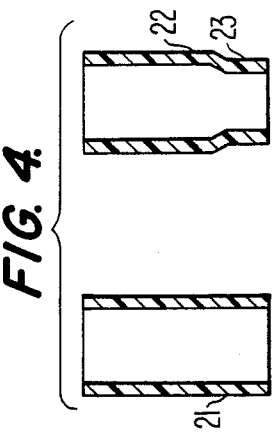

FIG. 4, two embodiments of a combustible cartridge case.

The screw extruder according to FIG. 1 has a housing 1 in which rotate two screws 2, which rotate in the same or opposite directions and whereof only one is visible in the drawing. A container 4 with a discharge member 5, e.g. a discharge sluice is arranged on the intake port 3 in housing 1. Container 4 receives an aqueous suspension of nitrocellulose, craft pulp and/or plastic fibres with additives. Immediately in the intake zone, the screw 2 has feed element 6 and directly downstream of the intake kneading and pressing segment 7, which squeeze out most of the water introduced into the extruder with the suspension. As a result of the forward pressure rise, the water runs rearwards and passes to the outside via a drain line 13. The drain line can optionally also contain a feed element, so as to remove any discharged fibrous material. In the represented embodiment, in the vicinity of the kneading and pressing segment 7 there are two successive injection nozzles 8, 9 for feeding in the polymer binders, which are admixed with the fibrous material after the squeezing out of the water. This is followed by feed elements 10 and further kneading segments 11, optionally in a repeated sequence, whilst the remaining section 12 is mainly used for the feeding and homogenizing of the fibrous material. This region can optionally also have a polymer binder injection nozzle 8.

To the head of housing 1 is fixed a female die 14, which shapes the entering fibrous material to a tubular structure 15. If necessary, immediately behind the die there can be a spraying means 16 for applying synthetic resin to the outside of the tubular structure 15. Behind the spraying means is then provided a pressing and cutting to length means 17, shown diagrammatically in greater detail in FIGS. 2 and 3. The pressing and cutting means is arranged on a slide, which follows the movement of the tubular structure 15 and is returned by the same movement distance following the cutting process. In the represented embodiment, the pressing means 17 comprises inner jaws 18 and outer jaws 19, which are movable opposite to one another, the inner jaws 18 being positioned within the tubular structure 15 or same is moved during the advance over the jaws.

As can be diagrammatically seen in FIG. 3, the jaws 18, 19 are transversly split. Between the particular jaw parts is guided the tool 20 of the cutting means, e.g. in the form of a cutting knife. This leads to a cleaner and more deformation-free cut. The upstream parts of jaws 18, 19 grasp and shape the leading end of the tubular structure 15, whilst the downstream parts surround the finished cartridge case, which is finally ejected from the mould tool during the return of the slide receiving the pressing and cutting means 17.

With an apparatus according to FIGS. 1 and 3, it is possible to produce the cylindrical cartridge cases 21 shown in FIG. 4, or also cases 22 with an area 23 retracted or drawn in at one end. This drawn in region e.g. serves to receive a base externally surrounding the case. Obviously other shapes are possible, through a corresponding construction of the pressing means jaws 18, 19.

We claim:

1. An apparatus for producing combustible NC-based cartridge cases as shaped ammunition for tubular weapons from an aqueous suspension of nitrocellulose, NC-stabilizers, flammable fibrous material, synthetic resin, and, optionally, further binders and plasticizers by shaping the cylindrical case and squeezing out excess water, the apparatus comprising a double shaft screw extruder with kneading and pressing segments arranged directly downstream of a suspension intake and water outlet, with at least one binder injection nozzle arranged in one of a vicinity of the kneading segment and downstream thereof and a female die for shaping a tubular structure arranged at the outlet, length cutting means provided downstream of the female die, and a pressing means for finally densifying and calibrating the tubular structure, wherein the pressing means and length cutting means are combined to form a single unit, and wherein means are provided for enabling both the length cutting means and the pressing means to follow an advance movement of the extruded tubular structure.

2. Apparatus according to claim 1, characterized in that the double shaft screw extruder
includes at least one of a contrarotating and synchronized screw.

3. Apparatus according to claim 1, characterized in that a spraying means for applying synthetic resin to the outside of the tubular structure leaving the female die is arranged downstream of the screw extruder die.

4. Apparatus according to claim 1 characterized in that the pressing means and length cutting means are arranged on a common slide.

5. Apparatus according to one of claims 1 or 4, characterized in that the cutting means is positioned in the central region of the pressing means.

6. Apparatus according to claim 5, characterized in that the pressing means comprises outer and inner jaws.

7. An apparatus according to claim 3, characterized in that the spraying means is arranged between the female die and the pressing means.

8. An apparatus according to claim 6, characterized in that the inner and outer jaws of the pressing means are substantially centrally split transversely to an axial direction and guides therebetween the cutting tool means.

* * * * *